(12) United States Patent
Uchiyama et al.

(10) Patent No.: US 6,211,496 B1
(45) Date of Patent: Apr. 3, 2001

(54) MOLYBDENUM DISILICIDE HEATING ELEMENT AND ITS PRODUCTION METHOD

(75) Inventors: Tetsuo Uchiyama; Wan Jiang, both of Saitama (JP)

(73) Assignee: Kabushiki Kaisha Riken, Tokyo (JP)

( * ) Notice: Subject to any disclaimer, the term of this patent is extended or adjusted under 35 U.S.C. 154(b) by 0 days.

(21) Appl. No.: 09/252,791

(22) Filed: Feb. 19, 1999

(30) Foreign Application Priority Data

Feb. 20, 1998 (JP) .................................................. 10-055907
Feb. 9, 1999 (JP) .................................................. 11-031335

(51) Int. Cl.$^7$ ...................................................... H05B 3/10
(52) U.S. Cl. ........................... 219/548; 219/553; 338/223
(58) Field of Search ...................... 219/270, 534, 219/538, 543, 544, 548, 552, 553; 338/223, 224, 238, 243

(56) References Cited

U.S. PATENT DOCUMENTS

| | | | |
|---|---|---|---|
| 4,690,872 | * 9/1987 | Kato et al. ........................ | 219/548 |
| 5,420,399 | * 5/1995 | Sekhar et al. ...................... | 219/553 |
| 5,470,506 | * 11/1995 | Tanigami et al. .................. | 219/553 |
| 5,498,855 | * 3/1996 | Deevi et al. ....................... | 219/553 |
| 5,708,408 | * 1/1998 | Sundberg .......................... | 219/553 |
| 5,786,565 | * 7/1998 | Willkens et al. ................... | 219/548 |
| 5,948,306 | * 9/1999 | Konishi et al. .................... | 219/548 |
| 5,965,051 | * 10/1999 | Hirayama et al. ................. | 219/553 |
| 6,008,479 | * 12/1999 | Jiang et al. ........................ | 219/553 |

* cited by examiner

Primary Examiner—Teresa Walberg
Assistant Examiner—Fadi H. Dahbour
(74) Attorney, Agent, or Firm—Kubovcik & Kubovcik (57) ABSTRACT

The $MoSi_2$ heating element has not been so resistant under the low-temperature heating, because the low-temperature oxidation, which is attributable to the grain boundary oxidation, occurred. In the present invention, long life under the low-temperature heating is attained by the following two structures. (1) The $MoSi_2$ grains have a network structure and are linked three dimensionally. (2) The secondary, silica-bearing oxide or glass phase forms a net-like structure around the $MoSi_2$ grains.

16 Claims, 6 Drawing Sheets

MOLYBDENUM DISILICIDE HEATING ELEMENT AND ITS PRODUCTION METHOD

BACKGROUND OF INVENTION

1. Field of Invention

The present invention is related to a molybdenum disilicide ($MoSi_2$) based ceramic composite heating element, more particularly to the heating element of a heat-treatment furnace, in which severe temperature-distribution is required, such as an oxidation, diffusion or low-pressure chemical-vapor-deposition (LP-CVD) furnace for producing semiconductors. In addition, the present invention is related to a production method of the molybdenum-disilicide based ceramic composite heating element.

2. Description of Related Art

Heretofore, an Fe—Cr—Al based, metallic heating element has been used in a heat-treatment furnace for producing semi-conductors, such as an oxidizing, diffusion or LP-CVD furnace. In a recent development of the rapid thermal processing, which pursues micro-devices and enhances cost competence in the production of semiconductor devices, the $MoSi_2$ heating element has been used. That is, since the heat resistance of the $MoSi_2$ heating element is superior to that of a metallic heating element, the MoSi2 heating element can be used at a surface power density as high as approximately ten times that of the metallic heating element. For example, the permissible level of the surface powder density of the metallic heating element at 1000° C. is around 2 $W/cm^2$, while that of the $MoSi_2$ heating element at 1000° C. is 20 $W/cm^2$. Furthermore, by means of using the molybdenum-disilicide heating element and omitting a liner tube, which is usually made of silicon carbide and installed inside the heating element and the heat capacity of the heat treatment furnace is dramatically decreased. Therefore, only an inner tube made of quartz is installed inside the heating element as a processing tube. This feature readily leads to increasing the temperature-elevation and lowering rates. Specifically, in the case of a diffusion furnace, one heat-treatment time can be shortened by 60% or more, i.e., the conventional 200 minutes or more can be shortened to 80 minutes or less.

When the $MoSi_2$ heating element is operated in a temperature of 1400° C. or more and under ambient atmosphere, since a dense protective film consisting of silica ($SiO_2$) is formed on the surface of the heating element, the heating element can be stably operated. However, in a temperature range of 400 to 1200° C., where the oxidation, diffusion or LP-CVD furnace is operated, low-temperature oxidation, which is a characteristic of the $MoSi_2$ heating element, occurs and the polycrystalline material is pulverized, since the protective dense silica film is not formed. This is the so-called "pest" phenomenon. Under the present situation, the life of the $MoSi_2$ heating element is, therefore, unsatisfactory for the users.

The present applicant proposed in Japanese Unexamined Patent Publication (kokai) No. 8-143,365 published Jun. 4, 1996 to form on the surface of the heating element a silicon carbide (SiC) film by CVD. The effects attained by this film are, however, not yet wholly satisfactory.

SUMMARY OF INVENTION

It is, therefore, an object of the present invention to provide a molybdenum-disilicide based ceramic composite heating element, in which the low-temperature oxidation of $MoSi_2$ is prevented to satisfactorily prolong the life of the heating element used for the low-temperature heating, such as in a heat-treatment furnace for producing semiconductor.

It is another object of the present invention to provide a method for producing the molybdenum-disilicide composite-ceramic heating element.

Regarding the characteristic pest phenomenon of the $MoSi_2$ heating element, there is a report by Kurokawa in the 22nd Society for Corrosion Engineering (1995) pages 63–81, organize by Japan Corrosion Protection Society. According to this report, the "pest" phenomenon is considered to be caused by a volume expansion due to the formation of $MoO_3$ and high vapor pressure of $MoO_3$ at flaw of grain boundary in $MoSi_2$ sintered material. It seems, therefore, advisable to produce fully dense material free from flaws such as cracks and pores to prevent the "pest" phenomenon. It also seems to be important to form on the surface of the sintered material at a dense and stable oxidation protective coating of $SiO_2$.

As the present inventors have reported on a prevention of "Low Temperature Oxidation by (Direct) Current Heating" in $MoSi_2$ based ceramic composite for infrared radiation source regarding the present invention in Journal of The Japan Institute of Metals, Vol. 61(3) pages 247–248, 1997, on the other hand, it is observed that the protective silica film is fractured by charging with electricity and the low-temperature oxidation thus goes on. Although the formation of protective silica film on the surface mentioned above must be an important method for preventing the low-temperature oxidation, it should in fact be called a life-prolonging method rather than a "pest" avoiding method.

The present inventors considered that the main reason for the pest phenomenon resides in the fact that, when the $MoO_3$ is formed in the grain boundaries of $MoSi_2$, an intergranular fracture (a separation of grains) occurred. The present inventors then designed the following molybdenum-disilicide based ceramic composite. According to the conventional measure for preventing the pest phenomenon, a dense and stable protective $SiO_2$ film is formed on the surface of sintered material. According to the present invention, this measure is applied microscopically to the grain boundaries, so as to decrease the area of the grain boundaries, where the $MoSi_2$ grains are in contact with one another, to as low a level as possible. The resultant material is a composite of $MoSi_2$ and a silica-bearing oxide phase or a glass phase, which phase has a relatively low melting point as compared with the $MoSi_2$ Such composite has a micro-structure such that as much as possible of the silica-bearing oxide phase or the glass phase is existing at the grain boundaries of the $MoSi_2$ grains, thereby preventing the "pest" oxidation.

In accordance with the present invention, there is provided a based ceramic composite of $MoSi_2$ having a network structure and silica-bearing oxide phase or glass phase having a relatively low melting point as compared with the $MoSi^2$ and distributing in a net-like form along the boundaries of the $MoSi_2$ grains.

The molybdenum-disilicide based ceramic composite heating element having long life at low-temperature heating according to the present invention consists essentially of molybdenum disilicide grains having a network structure and a secondary phase consisting of at least one material selected from the group consisting of a silica-bearing oxide and a glass having a relatively low melting point as compared with said molybdenum disilicide, and further said secondary phase distributes in a net-like form along the boundaries of the said molybdenum disilicide grains.

The silica-bearing oxide phase or glass phase is preferably from 20 to 45% by volume.

According to an embodiment of the present invention, there is provided a heating element used in a heat-treatment furnace for producing semiconductors, in which the outer processing tube, i.e., the liner tube is omitted, and, further the heating element faces directly the quartz tube, in which semiconductor wafers are heat-treated. The impurities of the heating element according to this embodiment are limited to 0.05 mass % or less of Fe, 0.01 mass % or less of Cu, 0.05 mass % or less of Na and 0.05 mass % or less of K, and 0.16 mass % or less of the total of these impurities.

A method for producing the ceramic composite heating element according to the present invention by with a processing of sintering, bending and welding, is characterized in that: from 20 to 45% by volume of a clay mineral powder is added to the $MoSi_2$ powder, followed by blending with water; and, the blended mixture is shaped, dried and sintered in non-oxidizing atmosphere at a temperature of from 1250 to 1550° C., thereby forming the above mentioned net-like microstructure of the silica-bearing oxide or glass phase and the network structure of the $MoSi_2$ grains. In order to provide a heating element which is as dense as possible, (A) the $MoSi_2$ powder having 5 $\mu$m or less of average particle diameter is used, and (B) the clay mineral having 1 $\mu$m or less of average particle diameter is used. These raw materials are blended with added water and shaped to the desired size by means of any appropriately selected shaping method. The shaped material is dried and then sintered in a non-oxidizing atmosphere, such as nitrogen, argon and the like, at a temperature of from 1250 to 1550° C.

DESCRIPTION OF PREFERRED EMBODIMENTS

The present invention is hereinafter described more in detail with reference to the preferred embodiments.

Figure 10:
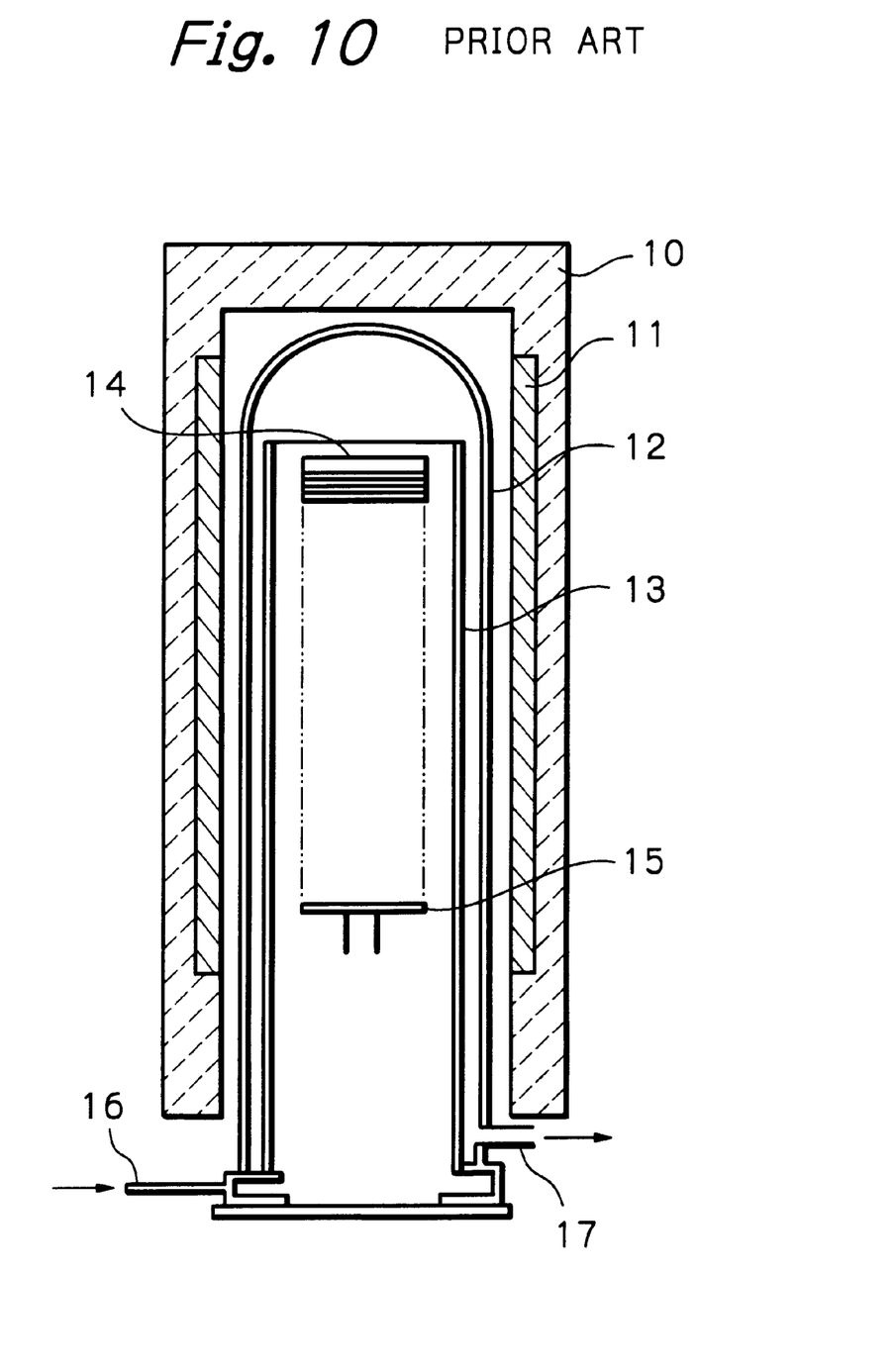
FIG. 10 shows a schematic drawing of an example of the known LP-CVD apparatus.

Referring to FIG. 10, the following parts of the known LP-CVD apparatus are illustrated: 10—furnace body; 11—heater, for which the molybdenum-disilicide based ceramic composite heating element according to the present invention is used; 12—quartz reactor tube; 13—inner quartz tube in the form of a sleeve for forming the gas channel; 14—semiconductor wafers; 15—supporting pedestal of the wafers; 16—gas-inlet tube; and, 17—gas-outlet tube. The liner tube is omitted and not used.

When the heating element used for the heater 11 shown in FIG. 10 is produced, (a) the $MoSi_2$ powder used should have 0.01 mass % or less each of impurity metals, such as Fe, Cu, Al, Ca, Mg, Na and K, the total of these impurity metals being 0.07 mass % or less, and (b) the natural clay mineral or artificial clay should have impurities limited to 0.3 mass % or less of Fe, 0.1 mass % or less of Cu, 0.1 mass % or less of Na and 0.1 mass % or less of K. However, clay mineral containing 0.1 mass % or more of Na can be used, provided that it is subjected to appropriate Na-removal treatment after the sintering to decrease the Na content of the heating element to 0.05 mass % or less. Such high Na clay must, however, have an impurity content of 0.3 mass % or less of Fe, 0.1 mass % or less of Cu, and 0.1 mass % or less of K.

The raw materials of as high purity as possible are used. In the semiconductor materials, device failure arises, due to heavy metals such as Fe, Cu and the like and alkali metals such as Na, K and the like. These materials may be incorporated in a trace amount in the heating element as the impurities and may pass through the quartz reactor tube 12 (FIG. 10) and contaminate the semiconductor wafers 14 being heated in the quartz reactor tube 12, when the heat-treatment furnace is of such type that the outer processing tube, i.e., the liner tube is omitted. It is, therefore, strictly required in such a furnace that the inner and outer furnace-materials are of very high purity. Particularly, since Cu has a relatively high diffusion coefficient in the quartz tube, the Cu content must be strictly limited.

The heating element according to the present invention prevents the above-mentioned problems by limiting the Fe impurity to 0.05 mass % or less, preferably 0.03 mass % or less, the Cu impurity to 0.01 mass % or less, preferably 0.005 mass % or less. Alternatively, the Mo and Si having purity of 99.9% or more, more preferably purity of 99.99% or more, are the raw materials of $MoSi_2$ of the present invention. The purity of the above-mentioned Mo and Si may also be such that the content of each of Fe, Cu. Al, Ca, Mg, Na and K is 0.01 mass % or less.

The silica-bearing oxide phase or glass phase is originated from the clay mineral having relatively low melting-point are used as the grain-boundary materials, because they are outstandingly oxidation-resistant and the film of these phases surrounds the $MoSi_2$ crystal grains to shield them from the oxidizing gas. Natural clay mineral or artificial (synthesized) clay mineral can be used as the starting materials of the silica-bearing oxide or glass phase having a relatively low-melting point. The specific natural clay mineral is refined montmoriollnite-bearing clay mineral, preferably Kunipia (trade name, produced and sold by Kunimine Industries Co., Ltd.) and Bengel (trade name, sold by Hojun Yoko Co., Ltd).

The clay minerals used for producing the heating element of a heat-treatment furnace, in which the outer processing tube, i.e., the liner tube is omitted, preferably fulfill the requirements (A) and (B), mentioned above. Clay mineral containing 0.1 mass % or more of Na can also be used, provided that it is subjected to appropriate Na-removal treatment after the sintering and further the Na content of the heating element is decreased to 0.05% or less. Such high Na clay must, however, have impurity content of 0.3 mass % or less of Fe, 0.1 mass % or less of Cu, and 0.1 mass % or less of K.

Specific artificial (synthesized) clay minerals, which can be used in the present invention, are, as designated by trade names, Sumecton SA (produced and sold by Kunimine Industries Co., Ltd.), Laponite or Hectite/Laponite (produced by Lapole Co., Ltd. and sold by Nihon Silica Industries Co., Ltd.), Ionite (produced and sold by Mizusawa Chemical Industries Co., Ltd.), and Thixopy (produced and sold by Kyowa Chemical Industries Co., Ltd.). Artificial (synthesized) kaolinite clay mineral (produced and sold by Toyo Denka Industries Co. Ltd.), may be used, as well.

The previously known technique to shape, and then to sinter the clay mineral (containing swelling bentonite) added $MoSi_2$ is disclosed for example in Japanese Examined Patent Publication (kokoku) No. 35-1235. However, the amount of the glass phase, which is formed by vitrification of the disclosed bentonite, amounts to only approximately 18% in said publication. This publication does not at all disclose the measures to be taken against the low temperature oxidation.

The proportion of the silica-bearing oxide phase and the glass phase is from 20 to 45% by volume. When the proportion is less than 20% by volume, the possibility of such phase existing at the grain boundaries of $MoSi_2$ grains becomes so low that low-temperature oxidation occurs. On the other hand, when the proportion is more than 45% by volume, the contact area between the $MoSi_2$ grains becomes so small that the network structure formed by linking the $MoSi_2$ islands is broken, as a result the thermal shock resistance is seriously impaired due to poor thermal conductivity to a level that the material is not usable as the heating element. The preferable proportion is from 25 to 40% by volume. In other words, the blending proportion of the clay mineral is determined to attain two properties: one is the net-form linking property of the silica-bearing oxide and the glass phase, that is, these phases are present at the $MoSi_2$ grains and are not isolated from one another but form a continuous net-form, such as the pro-eutectoid cementite of the hyper-eutectoid carbon steel; the other property is that the $MoSi_2$ grains form a three dimensional network structure, in which the $MoSi_2$ islands are three-dimensionally linked. These two phases, i.e., the net-like silica-bearing oxide or glass phase and the $MoSi_2$ grains having the network structure, are interwound.

The clay mineral melts during the sintering. The so-formed droplets of the melt tend to flow and be linked with each other to form a film around the $MoSi_2$ particles. This tendency becomes pronounced, when the proportion of the clay mineral is 20% by volume or more. In other words, when this proportion is less than 20% by volume, there are a number of isolated droplets of the melt and portions of the film not yet surrounding the $MoSi_2$ grains. Meanwhile, the network structure of $MoSi_2$ grains is like islands linked with one another. The $MoSi_2$ grains form a dominant network structure, when the volume fraction of $MoSi_2$ is greater than the amounts to approximately 55% or more, because of the reasons as follows. (1) the $MoSi_2$ has a morphology somewhat different from that of the glass phase, (2) the particle diameter of the starting materials of $MoSi_2$ is considerably greater than that of the clay mineral, and (3) the $MoSi_2$ does not melt during the sintering.

The above-described linking characteristic of the structure can be quantitatively expressed by using the Betti number as described by R. T. Dehoff and F. N. Rhiness in "Quantitative Microscopy" McGraw-Hill, New York (1968) page 325. Although only briefly described, the Betti number defined in the reference is the same as the number of islands in the region of the system. Actually, the Betti number is calculated by measuring the number of islands. The Betti number of $MoSi_2$ islands decreases with an increase in the volume percentage of the silica bearing oxide and glass phases. When the volume fraction of the silica-based oxide or glass phases is 45%, the Betti number is as small as zero and the linking characteristic of $MoSi_2$ grains disappears. On the other hand, the Betti number of the silica-bearing oxide and glass phases gradually increases with an increase in their volume fraction and their linking characteristic becomes appreciable at 20% by volume or more. When the volume fraction of silica-bearing oxide and glass phases is 20% or less, these phases are dispersed in the $MoSi_2$ matrix while, when the volume fraction of silica-bearing oxide and glass phases is 45% or more, the $MoSi_2$ are dispersed in the matrix consisting of silica-bearing oxide and glass phases. Therefore, in a case of volume fraction of 20% or less and 45% or more, the material is a particle-dispersion type composite. When the volume fraction is in a range of from 20 to 45%, the silica-bearing oxide or glass phase and the $MoSi_2$ phase are interwound and form a composite body having the network structure.

The method for producing a heating element based on the molybdenum-disilicide based ceramic composite is now described. The raw materials of $MoSi_2$ are preferably crushed to 5 μm or less, preferably 2 μm or less of average particle diameter by means of a ball-mill method. In order to prevent metal contamination in the crushing process of the raw materials, a ceramic container and media made of zirconia and the like are preferably used. The air-flow pulverizing method is also preferable. The so crushed $MoSi_2$ powder is blended with the clay mineral having 1 μm or less, preferably 0.5 μm or less of average particle size and with water, preferably pure water. The blended mixture is extruded into a rod shape and then dried. The sintering is then carried out in non-oxidizing atmosphere at a temperature of from 1250 to 1550° C. Since high-temperature sintering causes grain growth and is not favorable from the point of view of linking structure. The sintering temperature is preferably from 1300 to 1450° C. The rod-shape sintered material can be used as the heating element as it is, but may be subjected to a formation of the protective silica coating on the surface by means of conduction heating or external heating.

Figure 1:
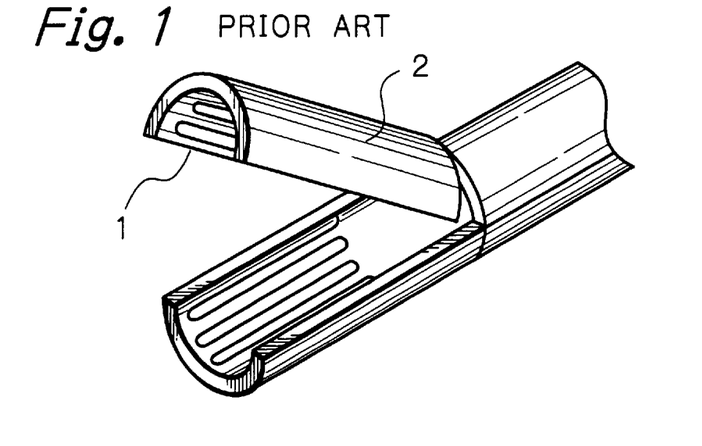
FIG. 1 shows a corrugated multi-shank heating element.
Figure 2:
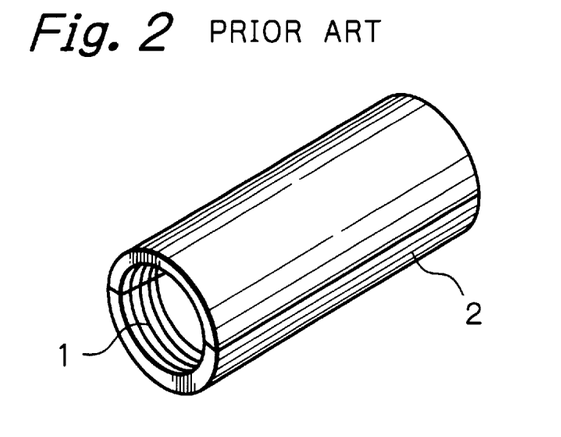
FIG. 2 shows a cylindrical spiral heating element.
Figure 3:
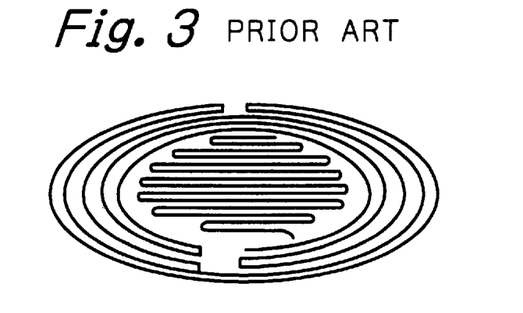
FIG. 3 shows a multi-shank heating element used in a single-wafer processing furnace.

The rod is then bent and welded to form the corrugated multi-shank heating element 1 (FIG. 1) which, is mounted on the semicylindrical heat-insulating material 2 used in a batch-type heat treatment furnace, a cylindrical and spiral heating element 1 as shown in FIG., or a flat, multi-shank heating element as shown in FIG. 3, which is used in a single wafer processing furnace.

Prior to mounting the heating element in a heat treatment furnace, the heating element may be conduction-heated or externally heated to form the fully dense protective silica coating having an appropriate thickness on the entire portion of the heating element.

The strengthened ceramic composite used in the present invention is now described. In order to provide the molybdenum disilicide based ceramic composite heating element with satisfactorily high mechanical strength at room temperature according to the present invention, the ternary strengthening phase(s) not to impair the heating element properties, which is selected from the group consisting of MoB, $Mo_2B$, $MoB_2$, $Mo_2B_5$, WB, $W_2B$, $WB_2$, $W_2B_5$, SiC, $HfB_2$, $ZrB_2$, $TiB_2$, TiB, HfC, ZrC and TiC, preferably MoB may be added to the composite made of $MoSi_2$ and silica-bearing oxide or glass phase. The average particle diameter of the strengthening phase is 5 μm or less. Note that the silica-bearing oxide or glass phase is a secondary phase and the strengthening phase is the ternary phase. The volume fraction of the strengthening phase is up to 35%, while the total volume fraction of the secondary phase and the secondary phase is limited 55% or less, so as not to impair the heat-generating property. The materials of the strengthening phase must be of high purity to maintain high purity of the heating element.

The average particle diameter of the raw materials is 5 μm or less. That is, $MoSi_2$, MoB, $Mo_2B$, $MoB_2$, $Mo_2B_5$, WB, $W_2B$, $WB_2$, $W_2B_5$, SiC, $HfB_2$, $ZrB_2$, $TiB_2$, TiB, HfC, ZrC and TiC each has an average particle diameter of 5 μm or less, because a fully dense material cannot be obtained at average particle diameter of more than 5 μm; the average particle diameter is preferably 2 μm or less.

The ternary phase, which consists of one or more compounds selected from the above compounds, may be contained in the proportion of from 5 to 35% by volume. When the volume fraction is less than 5%, the mechanical properties are not effectively enhanced. On the other hand, when the volume fraction is more than 35%, the total of secondary and ternary phases exceeds 55% by volume, which is not advantageous. The preferable volume fraction of the ternary phase is from 10 to 25%.

Now is described a method for producing a molybdenum disilicide composite-ceramics heating element, which is used particularly in a heat treatment furnace for producing the semiconductors.

The raw materials of the above mentioned, highly pure $MoSi_2$ and clay mineral or additionally the raw materials of the ternary strengthening phase are weighed in a predetermined amount. Water is added to the raw-material powder, which is then blended thoroughly, for example for 15 minutes or longer, by means of, for example, a kneader. After blending, water should be thoroughly absorbed in the clay mineral in the curing step for a certain time, for example 48 hours or longer in a sealed box, where drying is prevented. The resultant blended mixture is extruded into a rod form, dried, and then sintered in a non-oxidizing atmosphere, such as argon gas, at a temperature of from 1250 to 1550° C., because at lower than 1250° C. the sintering is not promoted satisfactorily, while at higher than 1550° C. the sintering temperature is so high as compared with the melting point of the clay mineral that the bubbling phenomenon disadvantageously occurs. Preferred sintering temperature is from 1300 to 1450° C.

In a heating element used in a heat treatment furnace which is not provided with the outer processing tube or the liner tube, the Na content of the heating element is preferably 0.05 mass % or less. When the Na content of the clay mineral is 0.1 mass % or more, the following treatment for the Na removal is preferably carried out after the sintering. Na in the heating element can be removed at a temperature in a range of from 1250 to 1550° C., in an oxidizing atmosphere and under reduced pressure of less than 1 atm. The pressure is preferably from 1 to 50 torr. When the evacuation is done to maintain the above pressure with dry air fed to the furnace, Na can be effectively removed. On the other hand, Na cannot be effectively removed in a reducing atmosphere of the furnace. In addition, if the pressure is less than 1 torr, the furnace atmosphere is likely to be reducing. The pressure is, therefore, preferably 1 torr or more. On the other hand, when the pressure is 50 torr or more, the surface of the heating element is oxidized to form a thick oxide film and also Na cannot be effectively removed. Instead of feeding air, oxygen may be fed. In this case, the pressure of the furnace atmosphere is determined by the oxygen partial pressure. The oxygen partial pressure, is therefore, controlled to obtain the preferable lower level mentioned above. When the treatment temperature is lower than 1250° C., Na cannot be effectively removed. At a temperature higher than 1550° C., the bubbling phenomenon disadvantageously occurs, since the temperature is much higher than the melting point of the clay mineral. Since the material is covered by a glass layer with defects after the Na removing treatment, the surface glass layer is preferably removed by shot-blasting and the like before operating as the heating element.

In the bending and welding process of the $MoSi_2$ heating element, selective oxidation may occur, so that the white fume of metal oxide may be formed. Usually, the $MoSi_2$ heating element should be subjected, subsequent to the sintering and prior to the bending and bonding, to the preliminary formation of a dense protective coating by means of current conduction or external heating, so as to prevent the white fume. However, in the present invention, there is no necessity of the preliminary formation of a protective coating. The protecting coating may nevertheless, be formed. The protective silica coating can be thoroughly formed by current conduction at a temperature of from 1200 to 1550° C. It is one of the features of the present invention that the protective coating can be formed while the white fume virtually does not generate.

The bending is carried out in a temperature range of from 1200 to 1550° C. At lower than 1200° C., satisfactory thermal plasticity is not attained, while at over 1550° C. the deformation becomes excessive such that appropriate shape cannot be maintained.

The heating elements are welded with one another and with the terminal of the heating element by fusion welding. Such welding is carried out in a temperature of from 1400 to 1700° C. under an inert-gas atmosphere such as argon or the like. When the welding temperature is less than 1400° C., the weld strength obtained is not satisfactorily high. On the other hand, when the welding temperature is more than 1700° C., the heating element deforms excessively such that appropriate weld shape cannot be maintained.

The molybdenum-disilicide based ceramic composite heating element according to the present invention can be used in heat treatment at a temperature of 1200° C. or less, particularly in the vicinity of 500° C., where the low temperature oxidation of molybdenum disilicide usually occurs. Such heat treatment is carried out in an oxidation, diffusion or LP-CVD furnace of a semiconductor-producing apparatus. In such application, the following features (i) and (ii) are realized.

(i) The $MoSi_2$ phase and the silica-bearing oxide or glass phase are interwound each other to form a mutual network structure. In such a structure, the grain boundaries of the $MoSi_2$ grains are so lessened that the low-temperature oxidation, i.e., the "pest" phenomenon, which is attributable to the grain boundary oxidation, can be prevented. If the structure is not the above-mentioned mutual network but is merely a network of the silica-bearing oxide or glass phase, that is, each of the $MoSi_2$ particles is completely surrounded by the silica-bearing oxide or glass phase, the low-temperature oxidation can be prevented but the network structure of the $MoSi_2$ phase, that is the skeleton of the sintered material, is not obtained at all. As a result, the resistivity of the material becomes too high to be applied as the heating element. In addition, the thermal shock resistance is seriously diminished, because the heat conductivity is lowered.

(ii) Raw materials of high purity are used. This is particularly important for preventing the contamination of semi-conductor wafers treated in a furnace in which the outer processing tube or the liner tube is omitted.

Since the heating element according to the present invention has the features (i) and (ii) mentioned above, it is highly resistant against the low-temperature oxidation and exhibits prolonged life. The heating element according to the present invention contributes, therefore, to the development of the heating furnace industry. No contamination problem of semiconductor devices occurs due to the heating element of the present invention. The heating element can be used in the production apparatus of semiconductor devices, which pursues micro devices and increased productivity.

The present invention is hereinafter described in more detail with reference to specific examples.

EXAMPLES

Examples 1–2 and Comparative Examples 1–2

Figure 4:
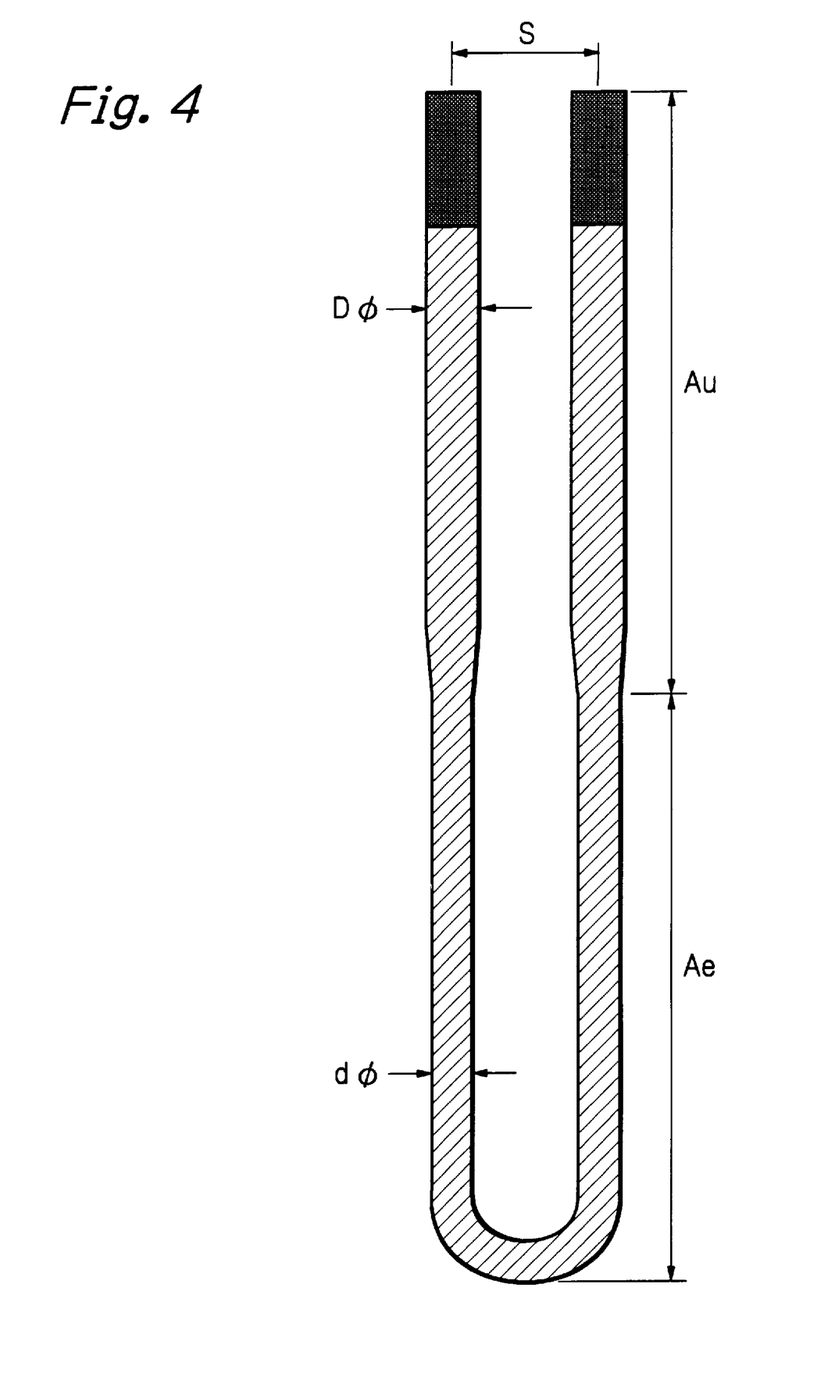
FIG. 4 shows a U-shaped heating element.
Figure 5:
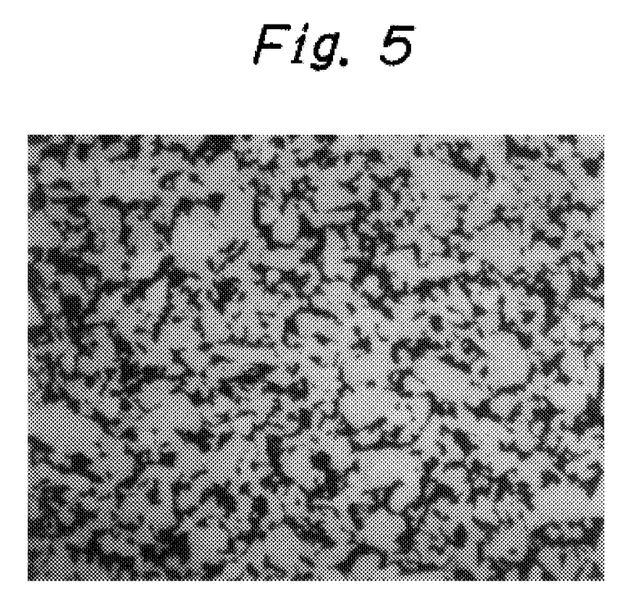
FIG. 5 is a microscopic photograph of Example 1 (magnification of 1000 times).
Figure 6:
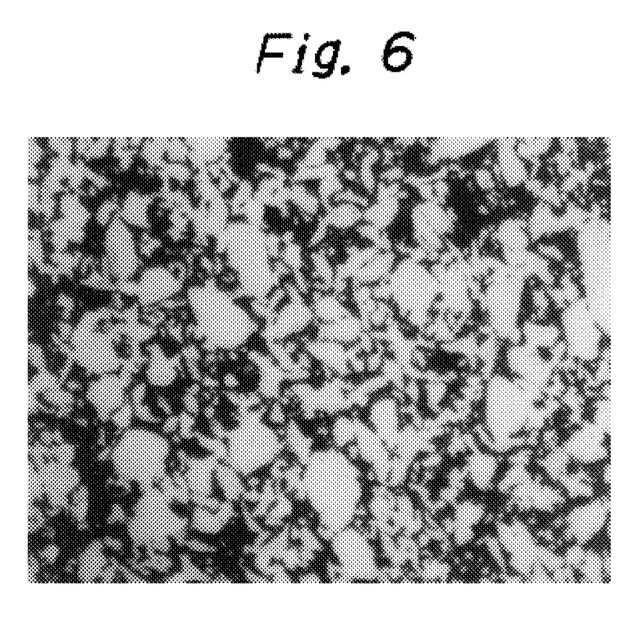
FIG. 6 is a microscopic photograph of Example 2 (magnification of 1000 times).
Figure 7:
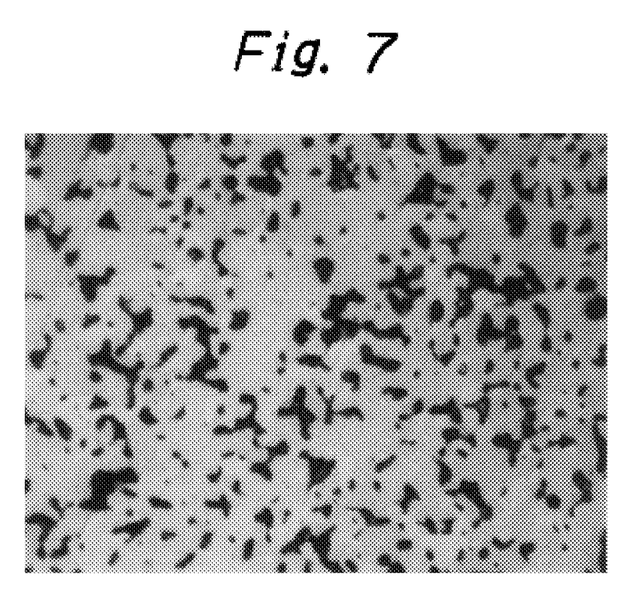
FIG. 7 is a microscopic photograph of Comparative Example 1 (magnification of 1000 times).
Figure 8:
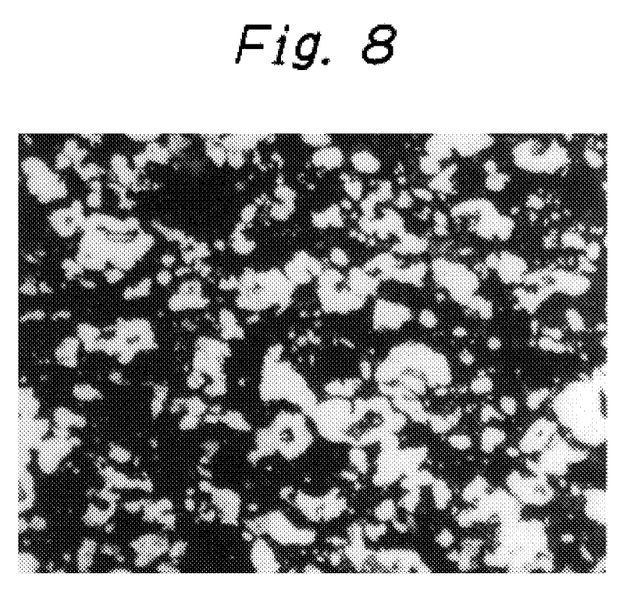
FIG. 8 is a microscopic photograph of Comparative Example 2 (magnification of 1000 times).

$MoSi_2$ having 3.72 μm of average particle diameter and 0.006 mass % of Fe impurity and 0.001 mass % of Cu impurity, and the refined montmorillonite clay mineral (trade name—Kunipia produced by Kunimine Industries Co., Ltd.) were prepared as shown in Table 1. The prepared mixture was blended dry by using a kneader for 10 minutes and then further kneaded for 20 minutes with a predetermined amount of added water. The amount of added water shown in Table 1 is expressed in outer parts by parts relative to 100 parts of the total weight of $MoSi_2$ and clay mineral. The resultant blended mixture was cured for three days and was then shaped into rods 3.4 mm and 6.9 mm in diameter by using an extruder. After drying, sintering was carried out in an argon atmosphere at 1340° C. for 2 hours. The rod-shaped sintered materials approximately 3 mm and 6 mm in diameter were thus obtained. From these sintered compacts the U-shaped heating elements shown in FIG. 4 were produced by bending and welding. The dimensions were as follows: Dφ=6 mm; dφ=3 mm; Au (length of terminal portion)=150 mm; and, Ae (length of element part)=200 mm. Aluminum was flame-sprayed on the terminal ends of the U shape.

TABLE 1

| | $MoSi_2$ volume % | Kunipia volume % | Water parts | Low Temperature oxidation | Remarks |
|---|---|---|---|---|---|
| Comparative Example 1 | 85 | 15 | 10 | vigorous | — |
| Example 1 | 70 | 30 | 11 | none | — |
| Example 2 | 60 | 40 | 11 | none | — |
| Comparative Example 2 | 50 | 50 | 11.5 | none | After current conduction treatment, strength decreased. |

In the tested heating elements, the welding portion of 6 mm-diameter (terminal) rod was chamferred roundly using a diamond grinding wheel to fit 3 mm-diameter (element) rod. The so produced U-shaped heating elements were installed in a furnace. The interior temperature of the furnace was adjusted to 400° C. The temperature of the heating elements was 500° C. in this case. Continuous current conducting test was carried out for 720 hours. It is shown in Table 1 whether or not the pulverization phenomenon of $MoSi_2$, which is a characteristic of the low-temperature oxidation, was observed in the test. In Comparative Example 1, since the amount of clay material is small, the pulverization phenomenon of $MoSi_2$ was observed only after 24 hours of the current conduction. In the inventive examples, the pulverization phenomenon was not at all observed even at the end of 720 hours. In Comparative Example 2, since the amount of clay material is large, the low-temperature oxidation was not observed but the strength deterioration was so serious after the current conduction treatment that its use as the heating element was considered to be difficult. The strength deterioration after current conduction is believed to be attributable to thermal shock during cooling from the heating temperature, which is accompanied with formation of minute cracks. These phenomena can be related to the microscopic structure of the sintered materials.

Referring to FIGS. 5 through 8 the microstructure of Examples 1, 2 and Comparative Examples 1, 2 are shown, formation of minute cracks. These phenomena can be related to the microscope structure of sintered materials.

Referring to FIGS. 5 through 8 the microstructure of Examples 1, 2 and Comparative Examples 1, 2 are shown, respectively. In Comparative Example 1 (FIG. 7), the secondary phase, which originates from the clay mineral, is present in the gray portion which is the $MoSi_2$ matrix. The isolated particles of the secondary phase are dispersed in the $MoSi_2$ matrix. Contrary to this, in Examples 1 and 2 (FIGS. 5 and 6, respectively), the secondary phase distributes along the $MoSi_2$ grains and hence they are surrounded by nets of the secondary phase. In Comparative Example 2 (FIG. 8) the clay mineral forms the matrix, in which the isolated $MoSi_2$ particles are dispersed.

Examples 3–6

The $MoSi_2$ used had 1.7 μm of average particle diameter. The $MoSi_2$ used contained as impurities 0.006 mass % of Fe, 0.001 mass % or less of Cu, 0.008 mass % of Al, 0.001 mass % or less of Ca, 0.001 mass % or less of Mg, 0.005% or less of Na and 0.001 mass % or less of K. The clay mineral used was artificial (synthesized) Sumectite clay, which contained as impurities 0.005 mass % of $Fe_2O_3$, 3.98 mass % of $Na_2O$, and 0.02 mass % of K (trade name—Sumecton SA, produced by Kunimine Industries Co., Ltd.). MoB, which was also used, had 2.6 μm of average particle diameter, and contained as impurities 0.01 mass % of Fe and 0.001 mass % of Cu. The $MoSi_2$, clay mineral and MoB were blended in the proportions shown in Table 2. The rod-shaped sintered materials having 3 mm and 6 mm in diameter were produced by the method of Example 2. The treatment for removing Na was then carried out at 1500° C. for 5 hours, while evacuating the furnace interior to reduce the pressure and simultaneously introducing dry air through a mass flow meter into the furnace to attain pressure of 3 torr. The Na-removed material was shot blasted to remove the superficial oxidation layer and was then subjected to the current conduction treatment. The U-shaped heating elements were thereafter produced. The impurities of the heating elements were 0.02 mass % of Fe, 0.001 mass % of Cu, 0.015% of Na and 0.012 mass % of K.

The rod-shaped sintered materials 3 mm in diameter were subjected to the current conduction treatment for 1 minute at 1500° C. to form the protective oxide coating. The three-point bending test of these sintered materials was carried out under the conditions of 50 mm of span and 0.5 mm/minute of cross head speed to measure the bending strength of the materials.

The U-shaped heating elements were subjected to the continuous current conduction test for 720 hours and at 400° C. of the furnace-interior temperature as in Example 2. The results are shown in Table 2. The pulverization phenomenon of $MoSi_2$, which is a characteristic of the low-temperature oxidation, was not observed.

TABLE 2

|  | $MoSi_2$ Volume % | Sumecton SA Volume % | MoB Volume % | Water parts | Bending Strength MPa | Low Temperature oxidation |
|---|---|---|---|---|---|---|
| Example 3 | 70 | 30 | 0 | 11 | 380 | none |
| Example 4 | 60 | 30 | 10 | 11 | 450 | none |

TABLE 2-continued

|  | $MoSi_2$ Volume % | Sumecton SA Volume % | MoB Volume % | Water parts | Bending Strength MPa | Low Temperature oxidation |
|---|---|---|---|---|---|---|
| Example 5 | 45 | 30 | 25 | 11 | 500 | none |
| Example 6 | 45 | 20 | 35 | 10.5 | 490 | none |

The bending strength is enhanced by the addition of MoB.

Examples 7, 8

The $MoSi_2$ used in Example 1 was also used in these examples. The synthesized kaolinte (product of Toyo Denka Co., Ltd.) additionally used in these examples had 45.9 $m^2/g$ of specific surface area, and contained as impurities 0.09 mass % of $Fe_2O_3$, 0.06 mass % of $Na_2O$ and 0.01 mass % of $K_2O$. The $MoSi_2$ and the synthesized kaolinite were blended in the proportions shown in Table 3. The U-shaped heating elements were produced by the method of Example 1 and the same tests as in Example 1 were carried out.

TABLE 3

|  | $MoSi_2$ Volume % | Synthesized Kaolinite Volume % | Water parts % | Low Temperature Oxidation |
|---|---|---|---|---|
| Example 7 | 75 | 25 | 10.5 | none |
| Example 8 | 60 | 40 | 11 | none |

Examples 9–12 and Comparative Examples 3, 4

The $MoSi_2$ and MoB used in Example 4 were also used in these examples and comparative examples. The refined montmorillonite clay mineral (trade name—Bengel 23 of Hojun Yoko Co., Ltd.) additionally used in these examples and comparative examples contained 0.82 mass % of $Fe_2O_3$ (0.29 mass % in terms of Fe) and 4.1 mass % of $Na_2O$ (1.52 mass % in terms of Na) and 0.27 mass % of $K_2O$ (0.1 mass % in terms of K). The $MoSi_2$, MoB and montmorillonite clay mineral in the volume proportion of 62%, 8% and 30%, respectively, were sintered and then subjected to the treatment of Na removal under the conditions shown in Table 4. The sintered materials having 3 mm of diameter, which were produced as in Example 1, were subjected to the measurement of bending strength by the method of Example 4. The results are shown in Table 4.

TABLE 4

|  | Sintering | | Na Removal Treatment | | | | Bending | |
|---|---|---|---|---|---|---|---|---|
|  | Temperature (° C.) | Time (h) | Temperature (° C.) | Time (h) | Pressure (torr) | Na (%) | Strength (MPa) | Remarks |
| Comparative Example 3 | 1200 | 5 | 1200 | 10 | 4 | 0.12 | 280 |  |
| Example 9 | 1280 | 2 | 1300 | 8 | 4 | 0.041 | 460 |  |
| Example 10 | 1340 | 2 | 1450 | 8 | 4 | 0.014 | 490 |  |
| Example 11 | 1420 | 1 | 1450 | 8 | 4 | 0.022 | 470 |  |
| Example 12 | 1500 | 1 | 1500 | 6 | 4 | 0.011 | 460 |  |
| Comparative Example 4 | 1450 | 2 | 1450 | 6 | 0.5 | 0.092 | 220 | Dual layer |

TABLE 4-continued

| | Sintering | | Na Removal Treatment | | | | Bending | |
|---|---|---|---|---|---|---|---|---|
| | Temperature (° C.) | Time (h) | Temperature (° C.) | Time (h) | Pressure (torr) | Na (%) | Strength (MPa) | Remarks |
| Comparative Example 5 | 1450 | 2 | 1450 | 6 | 100 | 0.054 | 420 | |
| Comparative Example 6 | 1600 | 0.5 | 1600 | 5 | | 0.001 | 190 | Roughened surface |

Examples 13 and 14

Figure 9:
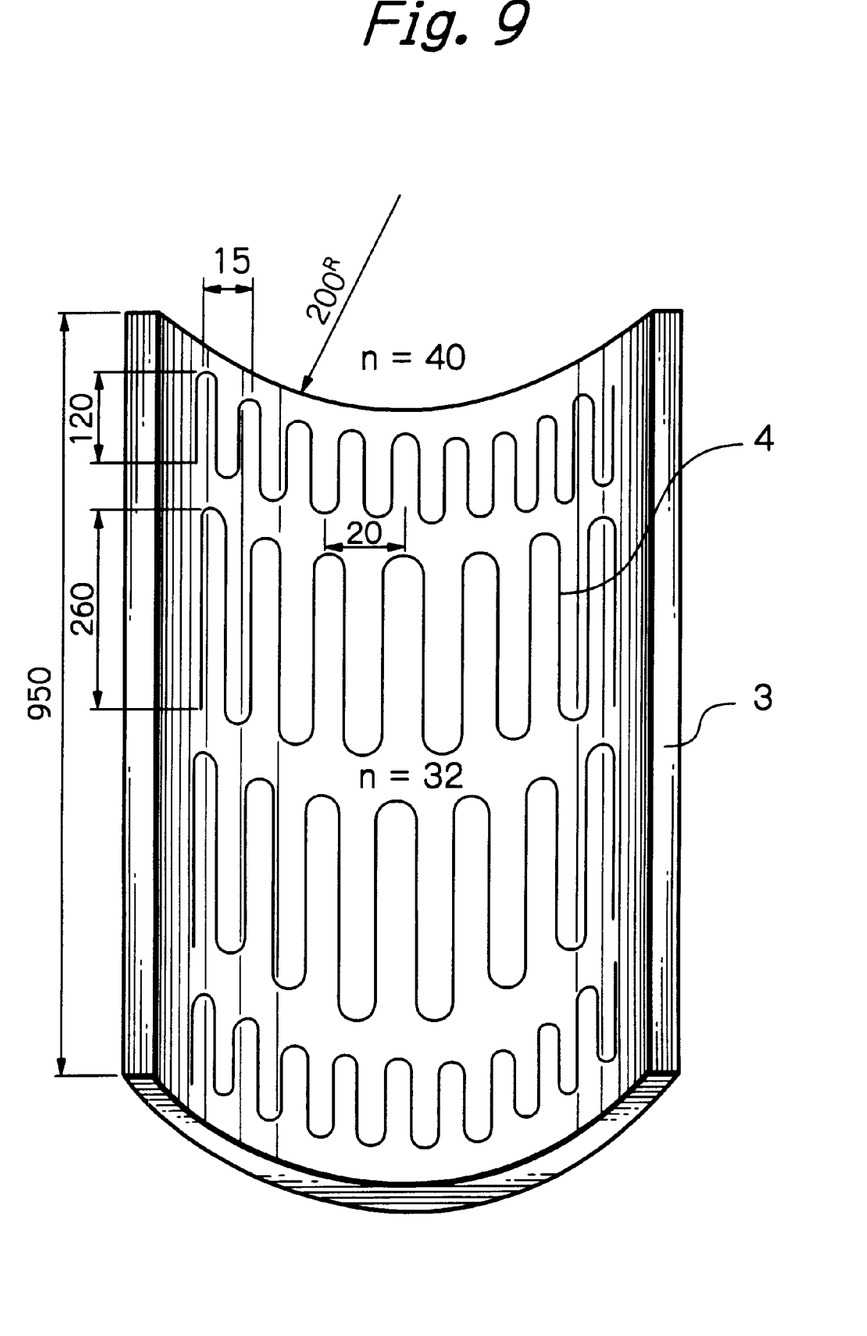
FIG. 9 shows a corrugated multi-shank heating element.

The material of Example 3 and the material of Example 10 were used to produce the meander-type multi-shank heating element as shown in FIG. 9. Two kinds of meander-type multi-shank heating elements were produced using rods of 3 mm in diameter. One element had forty (40) shanks with the shank pitch (d) of 15 mm and the shank length of 120 mm. The other had thirty two (32) shanks with the shank pitch (d) of 20 mm and the shank length of 260 mm. The 40-shank elements were mounted on the top and bottom zones and the 32-shank elements were mounted on the center zones of a semi-cylindrical insulating mould of 200 mm in inner radius and 950 mm in length. The insulating mould was made of ceramic fiber. A pair of semi-cylindrical mould, on which the four meander-type multi-shank heating elements were mounted as described above, were combined to form the heating element module in a tubular form and mounted in a batch-type heating furnace. In FIG. 9, "n" means a number of shanks.

The performance of the heating element was evaluated in a diffusion furnace. The evaluation was also carried out in accelerated mode. Rapid temperature ramping was possible with regard to the materials of both Examples 3 and 10. The estimated life of these materials were approximately five years.

As is described hereinabove, since the molybdenum-disilicide based ceramic composite heating element according to the present invention has outstandingly improved low-temperature oxidation resistance, it has excellent life when used as the heater of a heating furnace for producing the semiconductors, such as the oxidation, diffusion or LP-CVD furnace which heretofore incurred problems of the low-temperature oxidation. In addition, since the heating element according to the present invention enables rapid temperature ramping, the semiconductor devices can be miniaturized and the productivity can be enhanced. The present invention can, therefore, contribute to the progress of semiconductor industries.

What is claimed is:

1. A molybdenum-disilicide based ceramic composite heating element having long life at low-temperature heating, consisting essentially of molybdenum disilicide grains having a network structure and a secondary phase consisting of at least one material selected from the group consisting of a silicon-bearing oxide and a glass having a relatively low melting point as compared with said molybdenum disilicide, and further said secondary phase is distributed within said network structure in a net-like form along the boundaries of the said molybdenum disilicide grains.

2. A molybdenum-disilicide based ceramic composite heating element according to claim 1, wherein said secondary phase is from 20 to 45% by volume.

3. A molybdenum-disilicide based ceramic composite heating element according to claim 2, wherein impurities of the heating element are limited to 0.05 mass % or less of Fe, 0.01 mass % or less of Cu, 0.05 mass % or less of Na and 0.05 mass % or less of K, and 0.16 mass % or less of the total of these impurities.

4. A molybdenum-disilicide based ceramic composite heating element according to claim 1, wherein impurities of the heating element are limited to 0.05 mass % or less of Fe, 0.01 mass % or less of Cu, 0.05 mass % or less of Na and 0.05 mass % or less of K, and 0.16 mass % or less of the total of these impurities.

5. A molybdenum-disilicide based ceramic composite heating element according to claim 4, installed in a furnace used at a temperature of 1200° C. or lower.

6. A molybdenum-disilicide based ceramic composite heating element according to claim 5, wherein the temperature is from 400 to 1200° C.

7. A molybdenum-disilicide based ceramic composite heating element according to claim 1, wherein said secondary phase consists of at least one material selected from the group consisting of sintered natural clay and artificial (synthesized) clay.

8. A molybdenum-disilicide based ceramic composite heating element having long life at low-temperature heating, consisting essentially of molybdenum disilicide grains having a network structure, a secondary phase consisting of at least one material selected from the group consisting of a silicon-bearing oxide and a glass having a relatively low melting point as compared with said molybdenum disilicide, and 35% by volume or less of a ternary strengthening phase consisting of at least one compound selected from the group consisting of MoB, $Mo_2B$, $MoB_2$, $Mo_2B_5$, WB, $W_2B$, $WB_2$, $W_2B_5$, SiC, $HfB_2$, $ZrB_2$, $TiB_2$, TiB, HfC, ZrC and TiC, having 5 μm or less of average particle diameter, with the proviso that the total of the secondary and ternary phases is 55% by volume or less, and further said secondary phase is distributed within said network structure in a net-like form along the boundaries of the said molybdenum disilicide grains.

9. A molybdenum-disilicide based ceramic composite heating element according to claim 8, wherein said ternary phase consists of MoB.

10. A molybdenum-disilicide based ceramic composite heating element according to claim 9, wherein said secondary phase is from 20 to 45% by volume.

11. A molybdenum-disilicide based ceramic composite heating element according to claim 9, wherein said secondary phase consist of at least one material selected from the group consisting of sintered natural clay and artificial (synthesized) clay.

12. A molybdenum-disilicide based ceramic composite heating element according to claim 8, wherein said secondary phase is from 20 to 45% by volume.

13. A molybdenum-disilicide based ceramic composite heating element according to claim 8, wherein impurities of the heating element are limited to 0.05 mass % or less of Fe, 0.01 mass % or less of Cu, 0.05 mass % or less of Na and 0.05 mass % or less of K, and 0.16 mass % or less of the total of these impurities.

14. A molybdenum-disilicide based ceramic composite heating element according to claim 13, installed in a heat treatment furnace used at a temperature of 1200° C. or lower.

15. A molybdenum-disilicide based ceramic composite heating element according to claim 14, wherein the temperature is from 400 to 1200° C.

16. A molybdenum-disilicide based ceramic composite heating element according to claim 8, wherein said secondary phase consists of at least one material selected from the group consisting of sintered natural clay and artificial (synthesized) clay.

* * * * *